US005857190A

United States Patent [19]
Brown

[11] Patent Number: 5,857,190

[45] Date of Patent: Jan. 5, 1999

[54] EVENT LOGGING SYSTEM AND METHOD FOR LOGGING EVENTS IN A NETWORK SYSTEM

[75] Inventor: Matt Brown, Los Angeles, Calif.

[73] Assignee: Microsoft Corporation, Redmond, Wash.

[21] Appl. No.: 675,463

[22] Filed: Jun. 27, 1996

[51] Int. Cl.[6] .................................................... G06F 17/30

[52] U.S. Cl. ....................... 707/10; 707/103; 395/200.49; 348/7; 348/12; 348/13; 348/34; 348/153

[58] Field of Search ............................ 707/10, 104, 103; 348/1, 6, 39, 10, 7, 12, 13, 34, 153; 273/269; 380/10, 23; 343/13; 395/200.49; 455/5.1; 379/93.19

[56] References Cited

U.S. PATENT DOCUMENTS

| | | | |
|---|---|---|---|
| 5,237,610 | 8/1993 | Gammie | 380/10 |
| 5,583,563 | 12/1996 | Wanderscheid | 343/13 |
| 5,638,113 | 6/1997 | Lappington | 348/12 |
| 5,659,350 | 8/1997 | Hendricks | 348/6 |
| 5,683,090 | 11/1997 | Zeile | 273/269 |
| 5,714,997 | 2/1998 | Anderson | 348/39 |

OTHER PUBLICATIONS

Oracle Press Release, N2K, Inc. Adopts Oracle Media Objects for Music Sampler and Shopping Application, http://www.oracle.com/corporate/press/html/n2k–pr.html, pp. 1–2, Oct. 1995.

Interactive Television Becomes Reality, http://www.isdmag.com/isdmag/Interactive.html, pp. 1–2, Jan. 1996.

*Primary Examiner*—Thomas G. Black
*Assistant Examiner*—Diane D. Mizralhi
*Attorney, Agent, or Firm*—Lee & Hayes, PLLC

[57] ABSTRACT

An event logging system is provided for an interactive entertainment network system having a headend or content provider interconnected via a distribution network to multiple user interface units. Each user interface unit has an event evaluator to determine whether an event is a loggable event. The user interface unit can be dynamically reconfigured to choose different groupings of events for logging. Loggable events are reported to an event log manager at the headend over the distribution network. The event logging system is designed so that the user interface unit does not need to know the exact location of the event log manager at the headend. The event log manager selects an appropriate database to store event information pertaining to the reported event. The database selection is based upon the kind of event being logged. The database might be local at the headend or remote therefrom. The event logging system is also designed to permit the operator to reconfigure where the events are actually logged to promote flexibility in resource allocation.

58 Claims, 6 Drawing Sheets

EVENT LOGGING SYSTEM AND METHOD FOR LOGGING EVENTS IN A NETWORK SYSTEM

TECHNICAL FIELD

This invention relates to interactive entertainment network systems. More particularly, this invention relates to logging events occurring on interactive entertainment network systems.

BACKGROUND OF THE INVENTION

Cable television systems are well-known and widely used for delivering high quality video to home televisions. Subscribers of cable television services are offered a broad array of programs, including traditional broadcast programs and special made-for-cable programs. Cable television services also offer some selective services in which a viewer can order by telephone to watch a special program. An example of this type of service is Pay-Per-View®.

Newer, interactive television (ITV) systems expand the assortment of services that can be provided to a viewer's home. ITV systems have a computerized control center, known as the "headend", which interactively communicates with multiple distributed television units located in subscriber homes, thereby allowing subscribers to order or select services from their own televisions. ITV systems offer the same traditional services of familiar cable television as well as a variety of new additional interactive services, such as on-demand applications. Examples of on-demand applications include video-on-demand which permits a viewer to order videos and watch them at his/her own time schedule, home shopping applications which enables a viewer to browse various stores and catalogs on TV and order products from home, and financial applications which allow a viewer to conduct banking and other financial transactions using the television.

During operation of ITV systems, it is desirable to record events reflecting operation of the system. There are several reasons for logging events, including to monitor system operation, detect system errors, and derive statistical data. This latter reason is particularly beneficial for monitoring usage patterns for resource planning and marketing information. For example, a system operator in charge of providing the programming to the subscribers might be interested in certain viewer usage patterns, such as what shows the viewer watches, how often the viewer tunes in, how frequently the viewer changes channels, and so forth. Merchants offering video catalogs over the ITV system might be interested in viewer shopping patterns, such as how often viewers used the home shopping application, how many viewers opened a particular merchant's catalog, what items in the catalog attracted the most attention, whether viewers returned to browse the same catalog multiple times, and so on.

The process of recording events is referred to as "event logging", a terminology adopted from the meticulous practice that a ship's captain uses to enter daily notes during a sea voyage. In the electronic world, events are logged in storage devices and later used in statistical analysis to derive some desired information concerning usage and operation of the system.

Some computer operating systems have an event logging component. The operating system Windows NT® from Microsoft Corporation logs events which reflect operation of the computer system. The events are logged locally to a storage, such as the hard disk drive, that is resident on the same computer that the operating system is running. The Windows NT® event logging process can also be conducted over a network, wherein events are logged on another computer remote from the host computer where the event arises. To accommodate remote logging, however, the host computer must know the remote computer to-which events are logged.

Conventional event logging procedures are not well suited for the ITV environment. Given the vast size of the ITV system, it is difficult for a logging component at the headend to track all of the distributed television units with respect to their events.

Accordingly, there is a need to design an event logging system that can be used in the interactive television environment that (1) offers global, centralized logging at the headend; (2) enables the logging facilities to be conveniently relocated within the headend without disrupting the logging process; and (3) a very large number and high frequency of events from the many televisions units.

SUMMARY OF THE INVENTION

This invention provides an event logging system for an interactive entertainment network system that is capable of centrally logging a large number of concurrently received events generated at subscriber homes. The interactive entertainment network system has a centralized headend interconnected via a distribution network to multiple user interface units located in subscriber homes. An example user interface unit is a TV set operably connected to and controlled by a set-top box. Individual events are generated and detected at the user interface units. For example, channel up/down, button presses, service requests, warnings, and errors are possible events that might be detected at the user interface units.

Each user interface unit has a processor and a log application program interface (log API) executing on the processor. The log API determines whether an event is a loggable event, which should be recorded, or a non-loggable event which should not be recorded. The log API looks to an event filter criteria stored in a shared memory at the user interface unit to assist in deciding which events are to be recorded and which are not.

The event logging system includes an event configuration manager which configures the event filter criteria kept in the shared memory at the user interface. In the implementation described below, the event configuration manager resides at the headend and writes the event filter criteria to the shared memory over the distribution network. In this manner, the event configuration manager can effectively program a selected group of user interface units by simultaneously broadcasting the event filter criteria to that selected group. The event configuration manager employs a standard network/database protocol, such as SNMP (Simple Network Management Protocol), to communicate with the shared memory at the user interface unit.

A group of interoperable servers are resident at the headend. The event configuration manager executes on one or more of the servers. Additionally, a logging service executes on one or more of the servers. The logging service is preferably configured as a callable object with a defined interface. The log APIs resident on the user interface units call to the logging service object using remote procedure calls (RPC) over the distribution network. The RPCs locate the interface for the logging service object no matter where the logging service object is physically residing at the time. The log APIs call and bind to the logging service object to report loggable events detected at the user interface units. By using a COM-based (Component Object Model based) architecture, the logging service object can be moved to different servers at the headend as planning or organization needs change, without affecting the event logging operation. This promotes tremendous flexibility.

The event logging system further includes multiple databases to store event information pertaining to different kinds of loggable events. In the preferred implementation, the databases are ODBC-compliant databases (i.e., Open DataBase Connectivity compliant databases) such as SQL (Structured Query Language) servers. Some of the databases reside locally at the headend to log event information pertaining to system operation and viewer usage patterns. Other databases might reside remotely from the headend to log event information pertaining to events that are not related to system operation. For instance, a merchant that sells its wares over the interactive entertainment network system might possess a database to record event information pertaining to loggable events that reflect the viewers' behavior in reviewing that merchant's catalog.

The logging service object at the headend is configured to select an appropriate database from among the multiple databases to store the event information for all of the loggable events reported by the user interface unit. In one implementation, a service string store at the headend provides a relational list correlating the appropriate database for a given kind of loggable event reported by the log API. The logging service object utilizes the service string store to select the appropriate database for storing event information pertaining to that loggable event.

The event logging system also has a database management application executing on one or more servers to route the event information from the logging service object to the appropriate database selected by the logging service object. This database management application is preferably a thin ODBC application program interface layer used to locate and communicate with the appropriate ODBC-compliant database selected by the logging service object. This aspect also promotes design flexibility in that the locations for storing event information can be dynamically changed to different databases by simply reconfiguring the database management API, without affecting the other parts of the event logging system.

A method for logging events in an interactive entertainment network system is also described.

DETAILED DESCRIPTION OF THE PREFERRED EMBODIMENT

Figure 1:
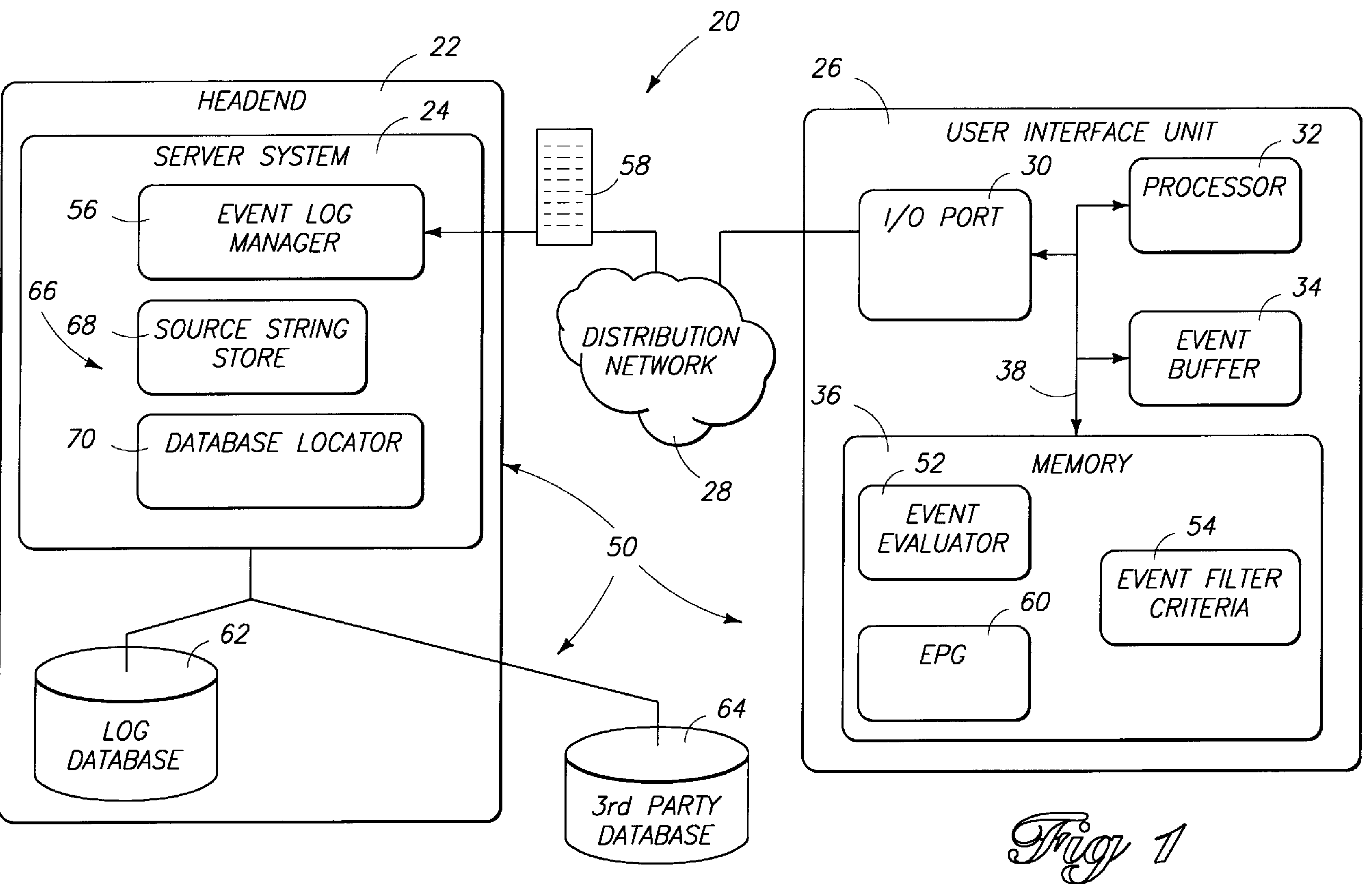
FIG. 1 is a block diagram of an event logging system for an interactive entertainment network system.

FIG. 1 shows an interactive entertainment network system 20 that is implemented with an event logging system. In the illustrated implementation, the interactive entertainment system is embodied as an interactive television system having a centralized computer center or headend 22 which is configured to serve video content programs and interactive services to multiple subscriber homes. Such programs and services might include, for example, traditional broadcast TV shows, cable programs, on-demand movies, video games, home shopping services, and banking services.

A single headend 22 includes at least one server. In the illustrated embodiment, the headend has a set of interoperable servers, which is represented a server system 24. One headend 22 is designed to service 250,000 or more homes.

The interactive entertainment network system 20 also has a user interface unit 16 located in each subscriber home. One example implementation of a user interface unit 26 is a set-top box (STB) coupled to control a conventional television set (TV) or other type video display device. The set-top box 26 receives digital video signals from headend 22 and controls which programs or services are displayed to the user. Instead of separate STBs, however, the user interface unit can be incorporated into the TV itself. In addition to television and STBs, the user interface unit might be implemented with other types of viewer computing units, such as a computer and monitor.

Headend 22 is interconnected to the subscribers' homes via an interactive distribution network structure, which is represented by a network cloud 28. One exemplary implementation of the distribution network is a hybrid fiber-optic/cable distribution network that employs digital switching technologies such as asynchronous transfer mode (ATM) for bi-directional communication between the headend and individual subscribers. This multi-tier distribution system includes a high-speed, high-bandwidth fiber optic cable coupled between the headend and many regional distribution nodes. The speed and bandwidth of the fiber optic cable affords the desired performance for supporting a fully interactive system. Each distribution node is then connected to multiple set-top boxes within the region via conventional home entry lines, such as twisted-pair telephone lines or coaxial cable. As an example, each regional distribution node might support approximately 1200 homes. Although a wire-based distribution structure is described, other implementations include satellite communications (e.g., DSS technologies), RF communication, or other wireless technologies. Moreover, the network can be constructed using a combination of wireless and wire-based technologies.

The user interface unit 26 is capable of requesting a plurality of services from the headend 22. The headend supplies these services on an individual basis to the requesting user interface unit. Example services include programs, video-on-demand (VOD), an electronic programming guide (EPG), shopping services, banking services, and the like. In one embodiment, the service applications are made available from the headend on different channels so that tuning to a channel effectively requests the service on-demand. There may be a designated channel for VOD, a designated channel for EPG, one or more channels for shopping, and one or more channels for banking. When the viewer tunes to the EPG channel, for example, the headend 22 of the interactive entertainment network system 20 downloads the EPG application and information over the distribution network 28 to the requesting user interface unit 26. The electronic programming guide allows a user to scroll through a grid-like menu which correlates program listings and specified start times.

The user interface unit 26 includes an I/O port 30 to receive video and digital data from the headend 22 and to transmit digital data back to the headend. The user interface unit also includes a processor 32, an event buffer 34, and a non-volatile memory 36. The I/O port 30, processor 32, buffer 34, and memory 36 are intercoupled by a multi-bit bus 38. It is noted that the buffer 34 might be configured as part of the memory 36, but is shown separately to assist in describing an aspect of this invention that is discussed more fully below.

An event logging system, which is referenced generally by numeral 50, has components distributed throughout the interactive entertainment network system 20. Some of the components reside at the headend 22, other components reside at the user interface unit, and still other components reside at locations other than the headend and user interface unit. Events are detected at the user interface unit 26 and reported to the headend 22.

Figure 2:
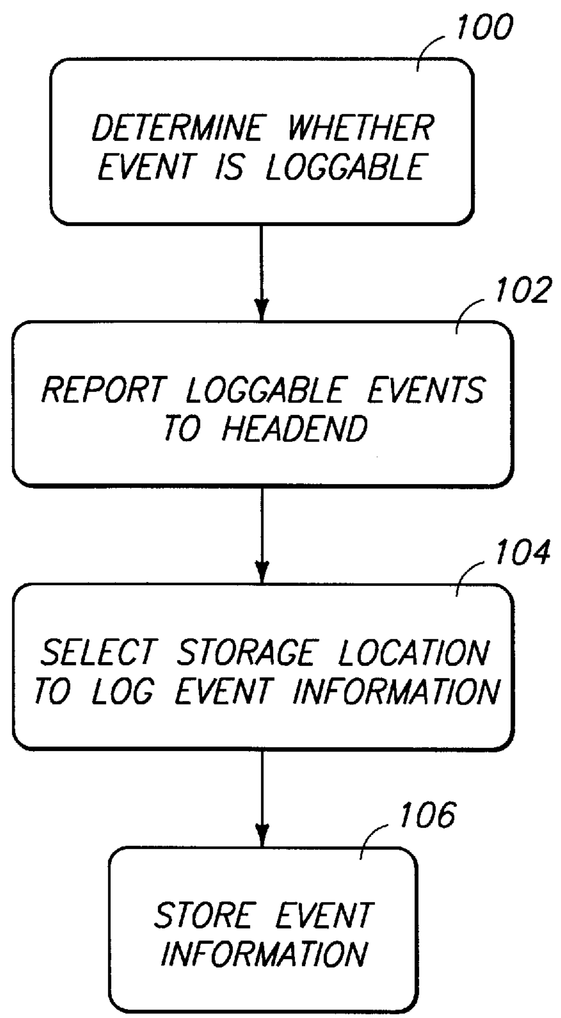
FIG. 2 is a flow diagram illustrating general steps in a method for logging events in an interactive entertainment network system.

FIG. 2 shows the general steps for operating the event logging system 50. At step 100, the user interface unit 26 determines whether an event is a loggable event. As noted above, the headend 22 is expected to support hundreds of thousands of homes. If all events generated by each user interface unit were logged at the headend, there would be a vast quantity of data sent to the headend and potential overloading of the interactive entertainment network system. Accordingly, the user interface unit 26 separates loggable events from non-loggable events to avoid overburdening the system. The user interface unit can be configured to choose different groupings of events for logging.

Loggable events are reported to the headend 22 over the distribution network 28 (step 102). The event logging system is designed so that the user interface unit 26 does not need to know the exact location to report the events at the headend. The headend selects an appropriate database to store event information pertaining to the reported events (step 104). An appropriate database is selected based upon the kind of events being logged. The event logging system is also designed to permit the operator to configure where the events are actually logged to promote flexibility in resource allocation. At step 106, the event information is logged in the selected database, which might be located at the headend or another remote location.

With reference again to FIG. 1, the event logging system 50 has an event evaluator 52 that resides at the user interface unit to perform an initial event screening. The event evaluator 52 determines whether an event occurring at the user interface unit is a loggable event or a non-loggable event. Routine operation at the user interface unit gives rise to many possible events, but not all of the events will be recorded or logged.

To assist in making a determination, an event filter criteria 54 is stored in memory 36 at the user interface unit 26 to specify which events are to be logged. The event filter criteria 54 can be configured by the headend to enable or disable specific subsets of events so that only enabled events are reported. Disabled subsets of events are considered to be non-loggable events and are not recorded. In one implementation (described more fully below), the event filter criteria contains sets of bit flags that are set if the corresponding event kind is to be logged. Configuring the event filter criteria 54 is discussed below in more detail with reference to FIG. 6. It is further noted that the headend can enable or disable the event evaluator 52 entirely to thereby turn off all event logging for that user interface unit.

Events are categorized into three primary classes: system events, security events, and application specific events. "System events" concern operation of the operating system. Examples of system events include excessive network errors, failure in a system service, or failure to start a logon application. "Security events" concern the security of the interactive entertainment network system. Examples of security events include use of an incorrect password by a user logging into the user interface unit, or authentication failures when attempting to authenticate a merchant during a commerce transaction over the distribution network. "Application events" concern operation of applications running on the user interface units. An example of an application event might be button presses on a remote control handset while the viewer is in an active application.

Events are also categorized into three general types: informational, warning, and error. "Informational events" are used for statistical reporting and for debugging purposes as well as to report the general status of the user interface unit. "Warning events" are used to report problems that are not immediately troublesome, but which might indicate a more dangerous problem in the future. For example, an application reports a warning event when it is running out of resources. "Error events" are used to report a problem that results in a loss of functionality or data. Examples of error events include an application failing to load or a system service failing to start. Error events occur infrequently.

In addition to the classes and types just described, each event can be assigned a degree of importance or importance level. The importance level is a binary value (e.g., 16-bit) that is attached as the upper bits to the binary value representing the specific event. The importance level is used to partition events in such as way that a system administrator can selectively determine the level of events that are reported to the headend from a particular event source.

The events are detected at the user interface unit in various ways. For instance, the processor 32 can electronically track when the viewer depresses control keys on a remote control handset to detect application events, or when a user enters a wrong password to detect security events. Interrupts are one common way to make the processor 32 aware of events, although there are other known techniques for alerting the processor to possible events. Once detected, the event evaluator 52, which is a program operating on the processor 32 in the illustrated implementation, decides whether to event is loggable or not.

For purposes of continuing discussion, suppose a system administrator of the interactive entertainment network system wants to monitor events that reflect viewers' usage of the electronic programming guide. For instance, the administrator might wish to monitor what programs the viewer considers when scrolling through the EPG by monitoring channel up/down inputs from a remote control handset or set-top box control panel. An EPG application 60 is shown stored in memory 36. The EPG application 60 is downloaded from the headend via distribution network 28 to I/O port 30 of user interface unit 26. As noted above, the EPG application can be launched by tuning to a channel designated to display the EPG. The EPG application 60 executes on the processor 32.

The administrator configures the event filter criteria 54 at the user interface unit 26 to enable the class or application events and the type of information events. If further distinction is permitted, the event filter criteria might also be configured to recognize events as arising from use of the EPG.

As the processor receives event-related interrupts, the executing event evaluator 52 looks to the event filter criteria 54 to determine whether an event occurring at the user interface unit is a loggable event or a non-loggable event. In this example, channel up/down commands while the user is active in the EPG application 60 represent loggable events, whereas channel selections while the user is operating outside of the EPG application might not be loggable events. The event evaluator 52 records the loggable event, but will not record the non-loggable event. As a result, the event evaluator 52 performs a task of filtering usable events for a selected analysis from events that are not relevant to the selected analysis. This filtering reduces the amount of information that is sent back to the headend and eventually logged. In the illustrated embodiment, event evaluator 52 comprises a program stored in memory 36 and executed on processor 32. The program-based event evaluator is described below in more detail with reference to FIG. 3.

The event logging system 50 also has an event log manager 56 resident at the headend 22 to manager where events are to be logged. The event evaluator 52 at the user interface unit 26 reports the loggable events over the distribution network 28 to the event log manager 56. The event log manager 56 is preferably a program that executes on one or more of the servers that make up the server system 24. The event log manager 56 can be dynamically moved about the servers at the headend as resources change, without affecting operation of the event logging system.

A forwarding registry 58 is utilized by the event evaluator 52 to locate the event log manager 56 at the headend, thereby alleviating the need for the event evaluator to know where the log manager 56 is physically and actually residing at the headend. The fowarding registry 58 is shown in the communication path from the user interface unit to the headend. It can be is located at the headend, or have components distributed over the entertainment network system. For event logging, the event evaluator 52 sends event-related messages over the distribution network 28 which contain a general well-known address for the event log manager. The well-known address is translated by the forwarding registry into the true address. If the event log manager 56 is moved, the forwarding registry is simply updated or reconfigured to account for the change of location. One implementation of a forwarding registry is through use of distributed computing techniques based on features of a network component object model (network COM) which includes directory services and remote procedure calls (RPCs). This implementation is described below with reference to FIG. 3.

The forwarding registry 58 can be configured to alternatively forward the event information to a location other than the event log manager. For example, the system operator might wish to run diagnostics on the interactive entertainment network system, and use the event information as a form of feedback. In this case, the system operator configures the forwarding registry to route event information to a diagnostic system, rather than the event log manager.

When reporting the events, the event evaluator 52 sends event information containing data about the events themselves, as well as other information concerning source of the event, type and class of event, and other descriptive data. The event evaluator can be configured to report the loggable events in real-time as they arise. However, establishing communication links with the headend often requires an expenditure in system resources, and thus, it might be more feasible to report groups of events. In this case, the loggable events are batched in event buffer 34 and then periodically reported in batch to the event log manager 56 at the headend. The local event buffer can be programmed or controlled to report the events at specified times or when a selected number of events has been recorded therein.

Upon receipt, the event log manager 56 determines where to log the event information. The event logging system 50 includes at least one database at the headend, represented by log database 62, to store the event information pertaining to the loggable events reported by the event evaluator 52. The event logging system 50 is likely to have multiple log databases, including a database dedicated to storing system events, a database dedicated to storing security events, and a database dedicated to storing application events. In addition, the event logging system 50 might include one or more log databases located remotely from the headend, as represented by a third party database 64 in FIG. 1. An example of a third party database is a storage unit located at a merchant's facilities to log events relating to viewers shopping patterns when browsing that merchant's catalog over the network.

The event log manager 56 is dynamically configurable to select one of the storage databases for logging the event information. The event log manager 56 preferably employs an relational list or table 66 that correlates different kinds of event information with corresponding databases. For instance, the relational list might correlate system events with one database resident at the headend, security events with another database resident at the headend, and application events with still other databases. In fact, the class of application events might be further divided into (1) events that pertain to applications run by the entertainment network system operator, such as EPG and VOD, which are to be logged on one or more databases at the headend and (2) events that pertain to applications designed for third parties, such as a merchant's catalog on the home shopping channel, which are to be logged at the third party database 64 remote from the headend.

The relational list 66 is shown embodied as a source string store 68. The messages used to report events from the user interface unit 26 contain a source string of identifiers as to the specific event, source of the event, class and type of event, and importance of event. The message also includes a description of the event. The source string store 68 relates the message source string with a particular storage location. The event log manager 56 compares the source string from the event reporting messages received from the user interface unit to the source strings kept in the source string store 68 to discern which database should store the event information.

The relational list 66 affords additional design flexibility in that database resources can be altered (added, reduced, moved, etc.), or in that the event information can be rerouted to different ones of the databases, without affecting operation of the event logging system. Once an alteration or rerouting is made, the relational list 66 is updated or reconfigured to reflect the new storage plan. The event logging manager 56 is not impacted by the change, but rather uses the reconfigured relational list to determine where event information is to be logged.

Event logging system 50 is also illustrated as having a database locator 70 which performs the task of actually locating and sending the event information to the selected database. Preferably, the database locator 70 is an application program interface executing on the server system 24. The database locator 70 and databases 62 and 64 are implemented using ODBC (Open DataBase Connectivity) protocols.

Figure 3:
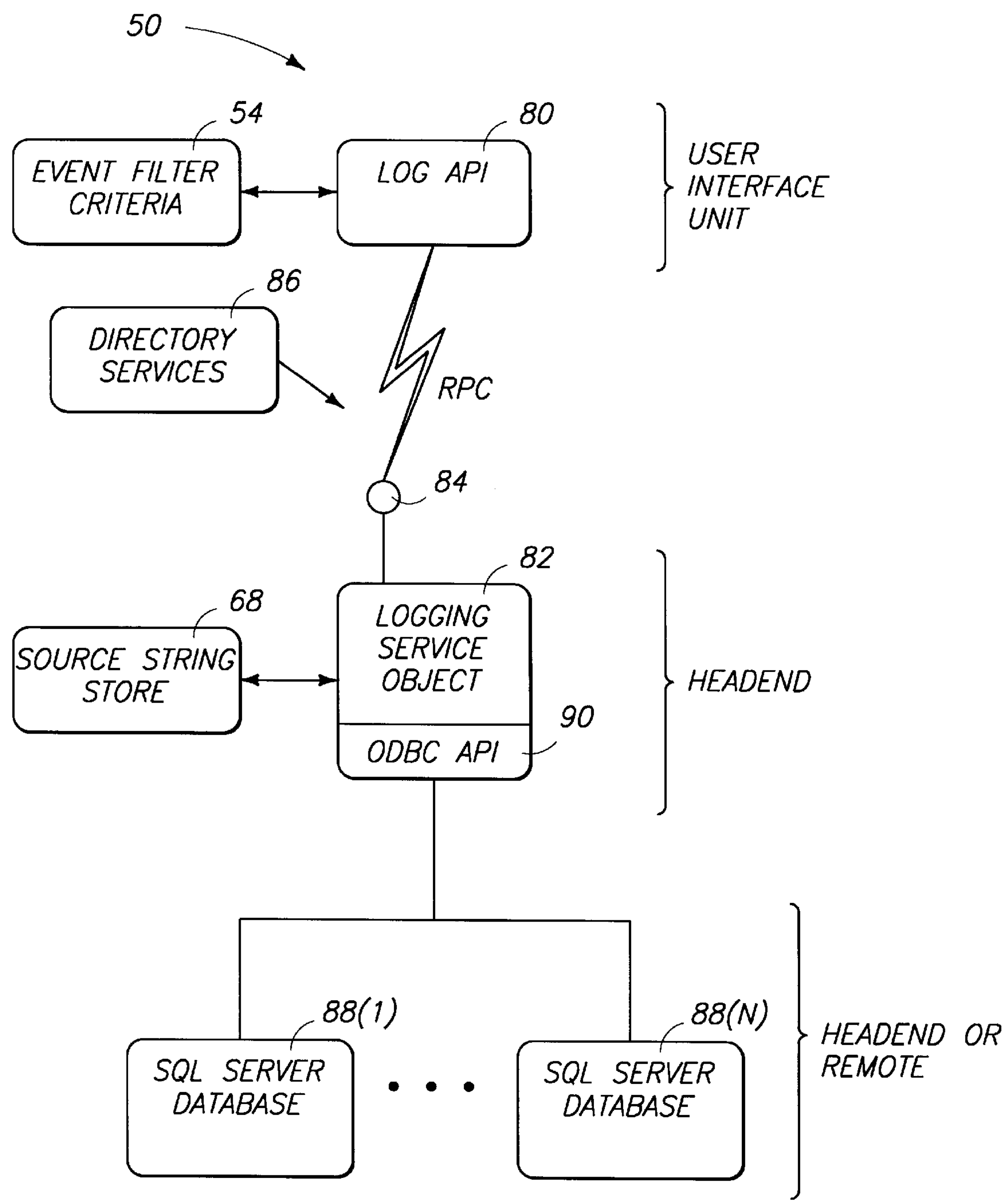
FIG. 3 is a software-based architectural diagram of the event logging system according to one implementation.

FIG. 3 shows a program-based architectural layout of the event logging system 50 according to one implementation. The event logging system is implemented using object-oriented applications. In the multi-processing entertainment network system, it is desirable to provide facilities for allowing one process to utilize the resources of another process. It is also desirable to provide a standard interface mechanism between processes so that application programs from different vendors can conveniently share resources using a common protocol. The object-oriented mechanism utilizes the concept of "objects" and "object interfaces" to specify interactions between computing units, such as the user interface units and the headend servers. An object in this environment is a unit of functionality that implements one or more interfaces to expose that functionality to outside applications. An interface is a contract between the user, or client, of some object and the object itself. In more practical terms, an object is a collection of related data and functions grouped together for a distinguishable common purpose. The purpose is generally to provide services to client processes. An interface is a grouping of semantically related functions through which a client process can access the services of the object.

The event logging system 50 shown in FIG. 2 is architected using a protocol known as the "network component object model", or network COM. Network COM is an extension of COM, a customarily used protocol for designing operating systems and applications. COM specifies how objects interact with each other using interfaces. Object linking and embedding (OLE) from Microsoft Corporation is an example COM-based language that is commercially available. OLE and COM have been well documented and will not be explained in detail. For more information regarding OLE and COM, refer to *OLE* 2 *Programmer's Reference* and *Inside OLE* 2, both published by Microsoft Press of Redmond, Wash., and both of which are hereby incorporated by reference.

In the COM environment, an interface is a block of memory containing an array of function pointers—that is, a function table. Through a standard object interface referred to as IUnknown, a client process can obtain a pointer to any interface supported by an object. When such an interface pointer has been obtained, it is said that the client process has obtained an interface on the object, allowing the client process to bind to the object. The pointer does not provide access to the entire object; instead, it allows access to one interface on that object.

Network COM is an extension of COM in that it specifies how objects interact with each other over a network. Here, objects are distributed at the headend and user interface unit and interact over the interactive distribution network. To a client process, the object appears to be readily available, as if it were running on the same computer. In reality, however, the object might be is running on a computer that is remotely located and only accessible over the network.

Calling a remote interface (one that is in a different address space than the calling process) requires the use of remote procedure calls (RPCs), which involve "stubs" and "proxies," and topics such as "marshalling" and "unmarshalling" of procedure parameters. These mechanisms are well understood and are documented in the books mentioned above. In regard to these topics, also refer to "X/Open DCE: Remote Procedure Call," published by X/Open Company Ltd., U.K, which is also incorporated by reference.

Figure 4:
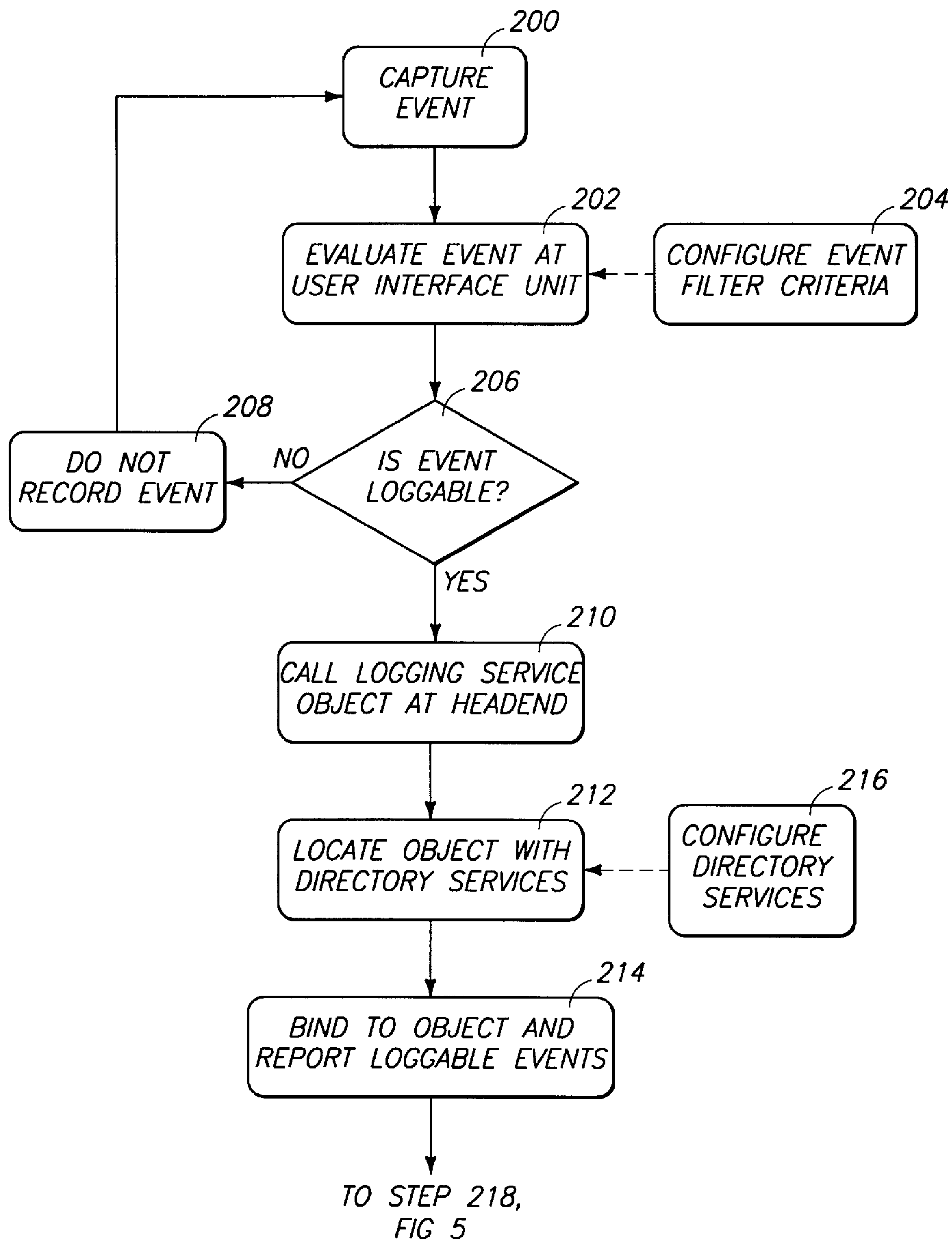
FIGS. 4 and 5 present a flow diagram of a method for logging events according to the implementation of FIG. 3.
Figure 5:
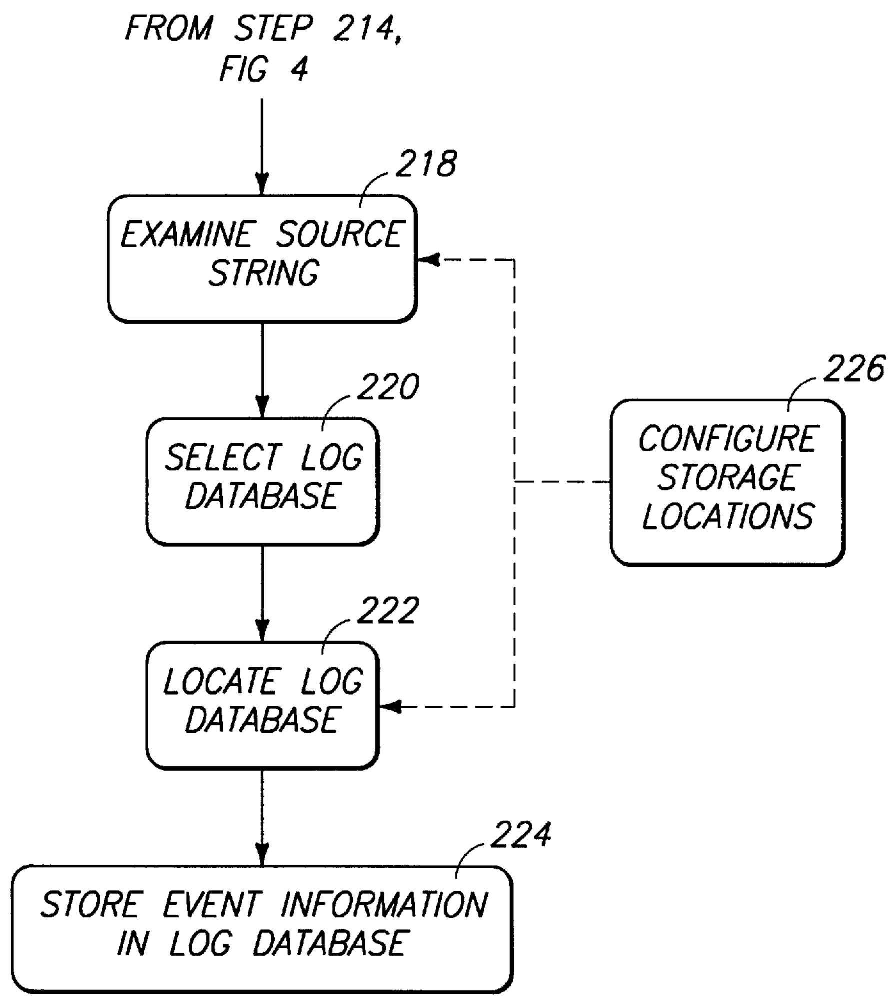

The COM-based implementation of the event logging system 50 and its operation will now be described with reference to the architectural diagram of FIG. 3 and the flow diagrams of FIGS. 4 and 5. Events are initially captured at the processor of the user interface unit (step 200 in FIG. 4). The event evaluator of the event logging system 50 is implemented as a log application program interface (log API) 80 which runs on the processor at the user interface unit. The log API 80 determines whether an event is a loggable event, which should be recorded, or a non-loggable event which should not be recorded (step 202). The log API 80 looks to the event filter criteria 54 stored in the memory at the user interface unit as guidance to which events are to be logged. The kinds of events which are logged at the headend can be dynamically changed by reconfiguring the event filter criteria 54, as represented by step 204. If the event is not loggable (i.e., the "no" branch from step 206), the processor does not record the event (step 208 in FIG. 4).

Table 1 explains various parameters that make up the log API 80.

TABLE 1

Parameters for Log API

| Parameter | Description |
|---|---|
| lpszSource | Identifies the source of event. |
| fwType | Specifies the specific class and type of the event being logged. |
| fdwInfoLevel | Specifies the approximate importance of the event, as well as a general source specific value that is used to selectively enable or disable reporting of groups of events. |
| fwCategory | Specifies the category to which this event belongs, and is source specific. |
| dwID | Source specific event identifier. |
| lpszMessage | Specifies a null-terminated string that describes the event. |
| cStrings | Specifies the number of substitution strings pointed to by the plpszStrings parameter. |
| plpszStrings | Points to an array of null-terminated strings that should be inserted into the message associated with this event. |
| cbData | Specifies the number of bytes of event specific raw binary data associated with the event. |
| lpbData | Points to a buffer containing the event specific raw binary data. |

Table 2 shows an example set of API function calls for the log API 80. Table 1 lists the parameters from table 1 and a brief description. There is no return value for the following functions.

TABLE 2

Log API Function Calls

| Function | Parameters | Description |
|---|---|---|
| ClientReportEvent | lpszSource, fwType, fdwInfoLevel, fwCategory, dwID, cStrings, plpszStrings, cbData, lpbData | Flexible Logging Function and is intended for use when arbitrary binary data is included with the event. |
| ClientReportEventSubst | lpszSource, fwType, fdwInfoLevel, fwCategory, dwID, cStrings, plpszStrings | Allows for substitution of strings into the event text at run time, but does not allow arbitrary binary data. |
| ClientReportSimpleEvent | lpszSource, fwType, fdwInfoLevel, fwCategory, dwID | Compact function for reporting events without data. |
| ClientReportDebugEvent | lpszSource, fdwInfoLevel, lpszMessage | Allows caller to specify static, non-localized string that should be placed in event log. It is used only for reporting debugging information. |

If an event is determined to be a loggable event (i.e., the "yes" branch from step 206), the log API 80 reports the loggable event to headend 22 on a per-event basis or in batch. The event log manager at the headend is implemented as a logging service object 82 with interface 84 which executes on the server system. When the log API 80 wishes to report a loggable event or a batch of loggable events, the log API calls the logging service object 82 using remote procedure calls (RPCS) over the distribution network (step 210 in FIG. 4). The RPCs contain a global address that is used to locate the interface for the logging service object no matter where the logging service object is physically residing at the headend at that time.

There are many objects operating on the server system at the headend. The objects collectively form a distributed object store because they are kept on multiple different servers. To locate the logging service object at the headend, regardless of where it physically resides, this implementation of the entertainment network system employs a directory services application 86 that remains running on the headend servers and user interface units. The directory services application 86 allows applications executing on the user interface units or headend to look up and activate objects in the object store without knowing where the object is physically stored. In fact, the object might very well be stored in more than one place, or moved from place to place.

The directory services devises a hierarchical name space using directories. Every object listed in the directory services has a unique name made up of the object's own name and a unique name of the directory that contains the object. A set of such names is referred to as the name space. In the distributed object store maintained for the interactive entertainment network system, there is only one root so that all objects belong to a single global distributed name space. Subsets of the global name space reside on individual machines, and are termed local name spaces.

The log API 80 uses a remote procedure call to activate the logging service object. The RPC contains the unique name of the logging services object 82 which the directory services 86 uses to actually locate the logging service object (step 212 in FIG. 4). Once located, the log API 80 binds to the logging service object 82 to report the loggable events detected at the user interface unit (step 214). By using a COM-based architecture, the logging service object can be moved to different servers at the headend as planning or organizational needs change, without affecting the event logging operation. If moved, a new directory name is assigned to the logging service object and the directory services 86 is modified to reflect the new location of the logging service object (step 216 in FIG. 4). This promotes tremendous flexibility.

The logging service object 82 selects an appropriate database to store the event information for the loggable events reported by the user interface unit. The logging service object 82 examines the source string on the message from the log API in view of the strings kept in service string store 68 to select the appropriate database for logging the event information (step 218 in FIG. 5).

The event logging system supports many different databases 88(1)–88(N) for storing event information pertaining to different kinds of loggable events. Some of the databases are locally resident at the headend while other databases are located remotely from the headend. The databases 88(1)–88(N) are preferably SQL (structured query language) servers which are ODBC compliant. Once the logging service object 82 selects the appropriate database 88(1)–88(N) (step 220 in FIG. 5), the logging service object 82 invokes an ODBC API 90 or a separate user interface provided with OBDC to locate the appropriate storage location (step 222). The event information is then routed to the storage location for logging (step 224). The locations for storing event information can be dynamically changed to different databases by either (1) reassociating the source strings with different storage locations, or (2) reconfiguring the ODBC layer to route the event information to different locations, without affecting the other parts of the event logging system. This is represented by independent configuration step 226.

Figure 6:
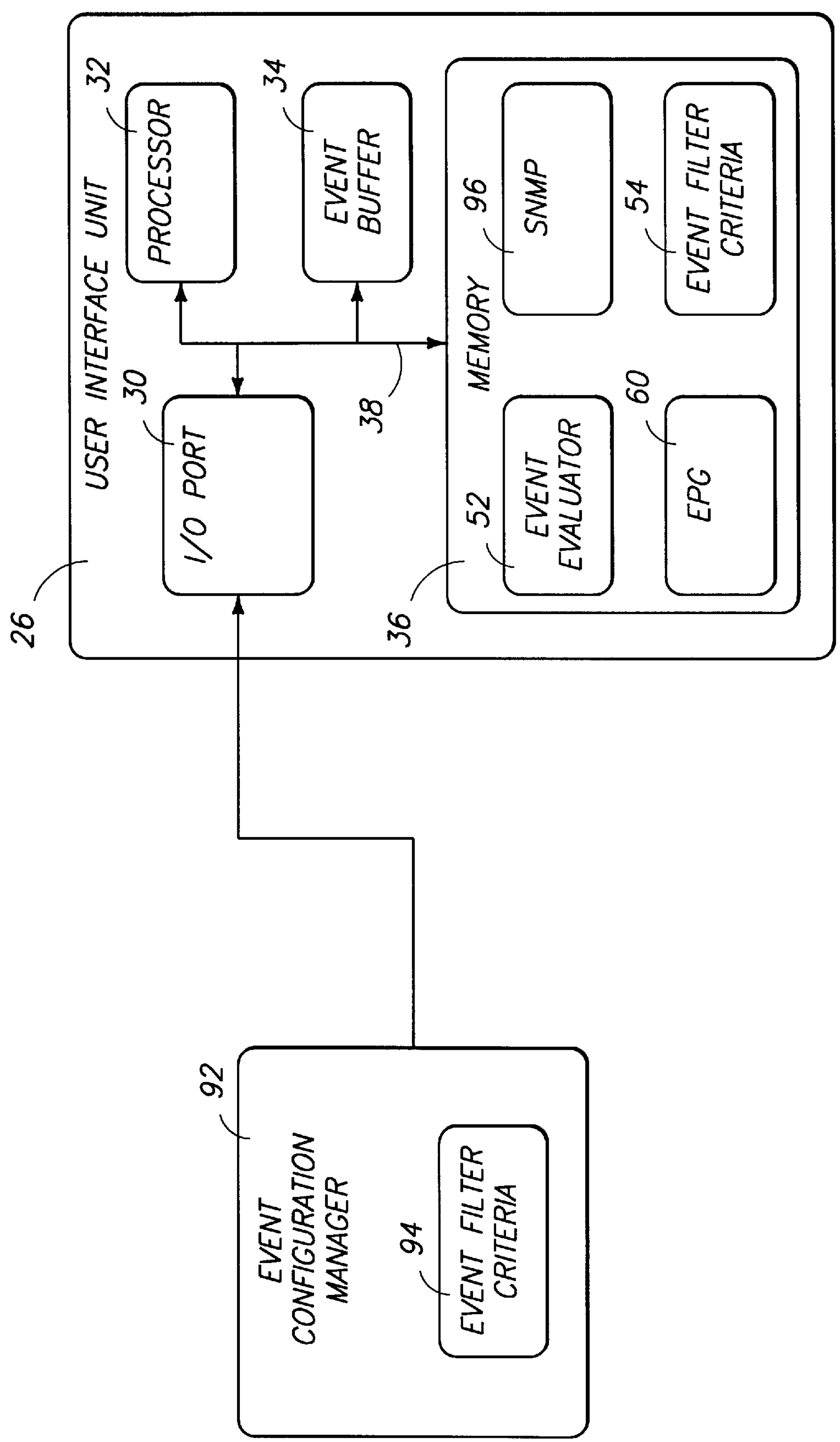
FIG. 6 is a block diagram of an event configuration manager used to configure the event logging system.

FIG. 6 shows an event configuration subsystem 92 according to another aspect of the event logging system. Event configuration subsystem 92 has an event configuration manager 94 which is capable configuring the event filter criteria in the user interface units. Preferably, the event configuration manager 94 resides at the headend and downloads the criteria over the distribution network to the user interface unit using a network protocol. The illustrated embodiment employs a standard network/database management protocol, such as the well known SNMP (Simple Network Management Protocol), to accomplish this configuration task. An SNMP application 96 is shown stored in memory 36 and is executable on processor 32 at the user interface unit.

The event configuration manager 94 seizes control of a shared portion of memory 36 through the SNMP application 96 and writes the new event filter criteria to the memory. Once configured, the event evaluator 52 of the user interface unit uses the event filter criteria set by the event configuration manager 94 to evaluate and screen events. The configuration and use of the filter are therefore separate and independent of the other, permitting dynamic alteration of the criteria without affecting or reconfiguring the event evaluator 52 itself. In this manner, the system administrator can set the filter criteria in a large number of user interface units in different subscriber homes from the headend.

Table 3 lists variables that can be configured as part of the event filter criteria.

TABLE 3

Event Filter Criteria Variables

| Variable | Description |
|---|---|
| stbSystem-EventTypes | This variable is a bit flag for the class of system events and consists of the OR'ed value of the three event types as follows. If a bit is set, that type of system class event will be reported.<br>EVENTLOG_ERROR_TYPE<br>EVENTLOG_WARNING_TYPE<br>EVENThOG_INFORMATION_TYPE |
| stbSecurity-EventTypes | This variable is a bit flag for the class of security events and consists of the OR'ed value of the three event types as follows. If a bit is set, that type of system class event will be reported.<br>EVENTLOG_ERROR_TYPE<br>EVENTLOG_WARNING_TYPE<br>EVENTLOG_INFORMATION_TYPE |
| stbApplication-EventTypes | This variable is a bit flag for the class of application events and consists of the OR'ed value of the tbree event types as follows. If a bit is set, that type of system class event will be reported.<br>EVENTLOG_ERROR_TYPE<br>EVENTLOG_WARNING_TYPE<br>EVENTLOG_INFORMATION_TYPE |
| stbSystem-InfoLevel | Specifies the maximum infolevel of system class events that should be reported to the central log server. |
| stbSecurity-InfoLevel | Specifies the maximum infolevel of security class events that should be reported to the central log server. |
| stbApplication-InfoLevel | Specifies the maximum infolevel of application class events that should be reported to the central log server. |
| stbMaxBufferAge | Specifies the number of seconds after which the local |

TABLE 3-continued

Event Filter Criteria Variables

| Variable | Description |
|---|---|
| | event buffer on the user interface unit should be forwarded to the central log server regardless of the number of events in the buffer. |
| stbMaxBufferSize | Specifies the maximum total bytes of event related data that should be buffered before forwarding the events to the central log server. If this value is exceeded, all events in the buffer are forwarded immediately, and the buffer age counter is reset to 0. |

It is noted that in the event filter criteria can be updated or modified in other ways. For example, the criteria can be loaded on a memory diskette which is physically ported to the user interface unit and downloaded locally using a memory drive.

Aspects of this invention may also be implemented in network or distributed systems other than the described interactive television embodiment. For example, the event logging system might be implemented in an Internet-based context having a content or program provider which serves content to and interacts with multiple user computing units. Additionally, aspects of the event logging system can be used in local or wide area networks, such as those used by companies, which have servers serving multiple clients.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. An event logging system for use in a network system having a content provider interconnected via a distribution network to at least one user interface unit, individual events being detected at the user interface unit, the event logging system comprising:

an event evaluator resident at the user interface unit to determine whether an event occurring at the user interface unit is a loggable event or a non-loggable event; and an event log manager resident at the content provider to manage where events are to be logged, the event evaluator reporting the loggable event via the distribution network to the event log manager at the content provider.

2. An event logging system as recited in claim 1, wherein the event evaluator does not record the non-loggable events.

3. An event logging system as recited in claim 1, wherein the event evaluator is configured to be selectively enabled or disabled.

4. An event logging system as recited in claim 1, wherein the event evaluator reports a degree of importance of the loggable event.

5. An event logging system as recited in claim 1, wherein the event is categorized into one of three classes selected from a group comprising: (1) system events for reporting on the interactive entertainment network system, (2) security events that relate to security aspects of the interactive entertainment network system, and (3) application events that pertain to operation of the user interface unit.

6. An event logging system as recited in claim 1, further comprising:

a buffer to temporarily batch multiple loggable events; and the event evaluator being configured to periodically report the batched loggable events to the event log manager.

7. An event logging system as recited in claim 1, further comprising:

multiple servers at the content provider; and the event log manager is configured to operate on a set of one or more of the servers and can be dynamically reconfigured to operate on a different set of one or more servers.

8. An event logging system as recited in claim 1, further comprising a database at the content provider to store information pertaining to the event reported by the event evaluator.

9. An event logging system as recited in claim 1, further comprising:

multiple databases for storing different kinds of event information;

a relational list at the content provider to relate the kinds of event information with the appropriate databases; and the event log manager using the relational list to select the appropriate database for storing information pertaining to the event reported by the event evaluator at the user interface unit.

10. An event logging system as recited in claim 9, wherein at least one of the multiple databases is resident at the content provider and at least one of the multiple databases is situated remotely from the content provider.

11. An event logging system as recited in claim 1, further comprising:

a processor resident at the user interface unit; and the event evaluator comprising a log application program interface (log API) which executes on the processor.

12. An event logging system as recited in claim 1 1, further comprising:

a server resident at the content provider; and the event log manager comprising a callable logging service object that can be called by the log API using a remote procedure call (RPC) over the distribution network.

13. An event logging system for use in a network system having a content provider interconnected via a distribution network to at least one user interface unit, individual events being detected at the user interface unit, the event logging system comprising:

an event log manager resident at the content provider to manage where events are to be logged;

the user interface unit being configured to report events to the event log manager over the distribution network; and a forwarding registry that is utilized by the user interface unit to locate the event log manager at the content provider, the forwarding register being configurable to change where events are reported at the content provider.

14. An event logging system as recited in claim 13, wherein the forwarding registry is configured so that the events are reported to a location other than the event log manager.

15. An event logging system as recited in claim 13, further comprising:

multiple servers at the content provider, the event log manager being supported by one or more of the servers; and the forwarding register being utilized by the user interface unit to report the events to the event log manager regardless of where the event log manager is physically located on the one or more servers.

16. An event logging system as recited in claim 13, further comprising an event evaluator resident at the user interface unit to determine whether an event occurring at the user interface unit is a loggable event to be sent to the event log manager.

17. An event logging system as recited in claim 13, further comprising:

multiple databases for storing different kinds of event information;

a relational list at the content provider to relate the kinds of event information with the appropriate databases; and the event log manager using the relational list to select the appropriate database for storing information pertaining to the event reported by the event evaluator at the user interface unit.

18. An event logging system as recited in claim 17, wherein at least one of the multiple databases is resident at the content provider and at least one of the multiple databases is situated remotely from the content provider.

19. An event logging system for use in a network system having a content provider interconnected via a distribution network to at least one user interface unit, individual events being detected at the user interface unit, the event logging system comprising:

an event log manager resident at the content provider to manage where events are to be logged;

the user interface unit being configured to report events to the event log manager over the distribution network;

multiple storage locations to record event information pertaining to the events reported to the content provider from the user interface unit; and the event log manager being configurable to select a storage location from among the multiple storage locations.

20. An event logging system as recited in claim 19, further comprising:

a relational list that relates different kinds of event information with corresponding storage locations; and the event log manager using the relational list to select the appropriate database for storing the event information.

21. An event logging system as recited in claim 19, wherein at least one of the multiple databases is resident at the content provider and at least one of the multiple databases is situated remotely from the content provider.

22. An event logging system as recited in claim 19, further comprising an event evaluator resident at the user interface unit to determine whether an event occurring at the user interface unit is a loggable event to be sent to the event log manager.

23. An event logging system for use in a network system, the event logging system comprising:

a memory resident at a computing unit;

an event configuration manager capable of writing an event filter criteria to the memory resident at the computing unit, the event filter criteria being used to determine whether an event is a loggable event or a non-loggable event; and an event evaluator resident at the computing unit and operably coupled to access the memory, the event evaluator being configured to determine whether an event should be logged in accordance with the event filter criteria stored in the memory.

24. An event logging system as recited in claim 23, wherein the event configuration manager is located remotely from the computing unit and writes the event filter criteria to the memory over the distribution network.

25. An event logging system as recited in claim 23, wherein:

the event configuration manager writes a new event filter criteria to the memory independently of the event evaluator; and the event evaluator evaluates subsequent events using the new event filter criteria stored the memory.

26. An event logging system for use in a network system having a content provider interconnected via a distribution network to at least one user interface unit, individual events being detected at the user interface unit, the event logging system comprising:

a processor resident at the user interface unit;

a log application program interface (log API) executing on the processor to determine whether an event is a loggable event;

a server resident at the content provider;

a logging service executing on the server, the logging service being configured as an callable object with a defined interface, the logging service object being callable by the log API using a remote procedure call (RPC) over the distribution network;

the log API being configured to call and bind to the logging service object and to report loggable events to the logging service object;

multiple databases to store event information pertaining to different kinds of loggable events;

the logging service object being further configured to select an appropriate database from among the multiple databases to store event information for a loggable event reported by the user interface unit; and a database management application program interface executing on the server to route the event information from the logging service object to the appropriate database selected by the logging service object.

27. An event logging system as recited in claim 26, further comprising:

a memory resident at the user interface unit to store an event filter criteria, the log API using the event filter criteria to determine whether an event is a loggable event.

28. An event logging system as recited in claim 27, further comprising:

an event configuration manager separate from the user interface unit which accesses the memory at the user interface unit to write the event filter criteria into the memory.

29. An event logging system as recited in claim 26, further comprising:

multiple servers resident at the content provider, the logging service object being executable on one or more of the servers.

30. An event logging system as recited in claim 26, further comprising:

a source string store that identifies an appropriate database from among the multiple databases for a given kind of loggable event reported by the log API; and the logging service object utilizing the source string store to select the appropriate database for storing event information pertaining to that loggable event.

31. An event logging system as recited in claim 26, wherein at least one of the multiple databases is resident at the content provider and at least one of the multiple databases is situated remotely from the content provider.

32. An event logging system as recited in claim 26, wherein log API is configured to perform a report function to report a loggable event to the logging service object, the report function including parameters selected from a group comprising: (1) identity of user interface unit; (2) class of event; (3) importance level of event; and (4) data.

33. A method for logging an event in a system having a content provider interconnected via a distribution network to at least one user interface unit, individual events being detected at the user interface unit, the method comprising the following steps:

determining, at the user interface unit, whether the event is a loggable event;

reporting loggable events to the content provider;

selecting a storage location to store event information pertaining to the loggable events; and storing the event information at the storage location.

34. A method as recited in claim 33, further comprising the following additional steps:

reporting the loggable events to an event log manager provided at one location within the content provider;

moving the event log manager from the one location to a new location within the content provider; and subsequently reporting the loggable events to the event log manager at the new location.

35. A method as recited in claim 33, further comprising the following additional steps:

storing an event filter criteria at the user interface unit; and the determining step comprises the step of examining the event in accordance with the event filter criteria to decide whether the event is a loggable event.

36. A method as recited in claim 33, further comprising the step of reporting identification information pertaining to the user interface unit.

37. A method as recited in claim 33, further comprising the following additional steps:

batching multiple loggable events at the user interface unit; and periodically reporting the loggable events that are batched.

38. A method as recited in claim 33, wherein:

the loggable events are reported to an event log manager that is implemented as a callable object executing at the content provider; and the reporting step comprises the step of calling the object using a remote procedure call over the distribution network.

39. A method as recited in claim 33, further comprising the following additional steps:

correlating different kinds of event information with associated storage locations; and selecting a suitable storage location in accordance with a kind of event information to be stored.

40. A method as recited in claim 39, further comprising the additional step of reassociating the different kinds of event information with different storage locations to alter where the event information is stored.

41. A method as recited in claim 33, wherein the storing step comprises storing the event information pertaining to some loggable events at a storage location that is local to the content provider and the event information pertaining to other loggable events at a storage location that is remote from the content provider.

42. A method for logging an event in a network system having first and second computing units interconnected via a network, the method comprising the following steps:

capturing an event at a first computing unit;

establishing a forwarding registry to direct where the event should be reported at the second computing unit;

reporting the event captured at the first computing unit to a place at the second computing unit that is located by the forwarding registry; and changing the forwarding registry to alter the place at the second computing unit to which the event is reported.

43. A method as recited in claim 42, further comprising the additional step of determining, at the first computing unit, whether the event is a loggable event.

44. A method for logging an event in a network system having first and second computing units interconnected via a network, the method comprising the following steps:

capturing an event at the first computing unit;

reporting the event to the second computing unit;

selecting a storage location from a group of storage locations to store event information pertaining to the event; and changing the group of storage locations to change where the event information is stored.

45. A method as recited in claim 44, further comprising the additional step of determining, at the first computing unit, whether the event is a loggable event.

46. A method as recited in claim 44, further comprising the following additional steps:

correlating different kinds of event information with associated ones of the storage locations; and selecting a suitable storage location in accordance with a kind of event information to be stored.

47. A method as recited in claim 44, wherein the group of storage locations contains storage locations local to the second computing unit and storage locations remote from the second computing unit.

48. A method for initializing an event logging system used in a system having a server unit interconnected via a network to at least one client unit, the method comprising the following steps:

(a) storing an event filter criteria in a memory resident at the client unit;

(b) determining, at the client unit, whether the event is a loggable event based upon the event filter criteria stored in the memory; and (c) changing the event filter criteria in the memory to a new event filter criteria so that subsequent events are analyzed under step (b) using the new event filter criteria.

49. A method as recited in claim 48, wherein the changing step (c) comprises remotely changing the event filter criteria from a remote location by transmitting the new event filter criteria over the distribution network.

50. An event logging system for use in a network system having a server interconnected via a network to at least one client, individual events being detected at the client, the event logging system comprising:

an event evaluator resident at the client to determine whether an event occurring at the client is a loggable event or a non-loggable event based upon an event filter criteria; and the event evaluator being reconfigurable to change the event filter criteria.

51. An event logging system as recited in claim 50, further comprising a forwarding registry that is utilized by the client to locate a place on the server to report the loggable events, the forwarding register being configurable to change where events are reported at the server.

52. An event logging system as recited in claim 51, further comprising:

multiple storage locations at the server to record the loggable events; and an event log manager, resident at the server, which is configurable to select a storage location from among the multiple storage locations.

53. A method for logging an event in a system having a server interconnected via a network to at least one client, individual events being detected at the client, the method comprising the following steps:

determining, at the client, whether the event is a loggable event based upon an event filter criteria; and reconfiguring the event filter criteria to change which events are consider loggable events.

54. A method as recited in claim 53, further comprising the following steps:

reporting loggable events to a location at the server that is identified by a forwarding registry; and changing the forwarding registry to report the loggable events to another location at the server.

55. A method as recited in claim 54, further comprising the following steps:

selecting a storage location from among multiple storage locations at the server to record the loggable events; and changing from one storage location to another to store the loggable events.

56. A computer-readable medium used in an event logging system having a server interconnected via a network to at least one client, the computer-readable medium storing computer-executable instructions for performing the following steps:

storing an event filter criteria at the client;

determining, at the client, whether an event is a loggable event based upon the event filter criteria; and changing the event filter criteria to a new event filter criteria so that subsequent events are analyzed using the new event filter criteria.

57. A computer-readable medium as recited in claim 56, further comprising computer-executable instructions for performing the following steps:

reporting loggable events to a location at the server that is identified by a forwarding registry; and changing the forwarding registry to report the loggable events to another location at the server.

58. A computer-readable medium as recited in claim 57, further comprising computer-executable instructions for performing the following steps:

selecting a storage location from among multiple storage locations at the server to record the loggable events; and changing from one storage location to another to store the loggable events.

* * * * *